United States Patent
Desclos et al.

(10) Patent No.: US 9,768,991 B2
(45) Date of Patent: Sep. 19, 2017

(54) MULTI-MODE ACTIVE CIRCUIT CONTROL AND ACTIVATION SYSTEM

(71) Applicant: Ethertronics, Inc., San Diego, CA (US)

(72) Inventors: Laurent Desclos, San Diego, CA (US); Sebastian Rowson, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 0 days.

(21) Appl. No.: 15/074,753

(22) Filed: Mar. 18, 2016

(65) Prior Publication Data
US 2016/0204965 A1    Jul. 14, 2016

Related U.S. Application Data

(62) Division of application No. 13/674,077, filed on Nov. 11, 2012, now Pat. No. 9,325,543.

(51) Int. Cl.
*H04L 25/49* (2006.01)
*H04B 1/40* (2015.01)

(52) U.S. Cl.
CPC ........... *H04L 25/4902* (2013.01); *H04B 1/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0236077 A1* | 12/2003 | Sivard | ............... | H04W 52/0229 455/127.1 |
| 2009/0168462 A1* | 7/2009 | Schopfer | ........... | H02M 3/33523 363/21.01 |
| 2012/0139768 A1* | 6/2012 | Loeda | ..................... | H03M 5/08 341/143 |

* cited by examiner

*Primary Examiner* — Kabir A Timory
(74) *Attorney, Agent, or Firm* — Coastal Patent Law Group, P.C.

(57) ABSTRACT

An active circuit control system that utilizes multiple PWM signals to activate and power an array of active components, requiring minimal wiring between the multi-mode signal conditioner and active components. Signal conditioning and filtering is implemented to allow transmission of power and control signals for multiple components over a single or multiple transmission lines. The circuit can be used to provide supply voltage and control signals for active antennas, switch networks, and other components in communication systems and electronic devices.

8 Claims, 14 Drawing Sheets

MULTI-MODE ACTIVE CIRCUIT CONTROL AND ACTIVATION SYSTEM

CROSS-REFERENCE TO RELATED APPLICATIONS

This application is a division of U.S. Ser. No. 13/674,077, filed Nov. 11, 2012.

BACKGROUND OF THE INVENTION

Field of the Invention

The present invention relates to the field of wireless communication; and more particularly to systems and methods for control and activation of active circuits used in a wide variety of active antenna systems, active modules and transceivers implemented within communication systems.

Description of the Related Art

As new generations of handsets and other wireless communication devices become smaller and embedded with more applications, novel antenna solutions are required to address inherent limitations of these devices. With passive antenna structures, a certain physical volume is required to produce a resonant antenna structure at a particular radio frequency and with a certain bandwidth. With the advent of a new generation of wireless devices and communication technologies, passive antenna structures are becoming less desirable. Instead, these passive antennas will eventually be replaced with active antenna structures configured to provide beam switching, beam steering, space or polarization diversity, dynamic impedance matching, dynamic frequency switching, mode switching, etc., in order to reduce the size of devices and improve performance. Future antennas will require the addition of one or multiple active components coupled to the antenna structure to provide these dynamic features resulting in a more capable and robust antenna system.

Wireless devices are also experiencing a convergence with other mobile electronics devices. Due to increases in data transfer rates, processor and memory resources, it has become possible to offer a wide variety of products and services on wireless devices that have typically been reserved for more traditional electronic devices. This increase in functionality in a mobile wireless device continues to put pressure on the designer to reduce overall size of antennas and the components and wiring required to actively enable the antennas.

One such concern in the art is how to implement a multi-mode active antenna having a plurality of active components for tuning the antenna; since under certain conditions multiple wires or cables may be needed, thereby driving a larger volume in the resulting device.

There is a need for antenna solutions which address these challenges of increasing antenna capability while maintaining a small form factor. There is also a need for a method of supplying control signals and power to active components integrated into antennas and other devices to yield a space saving configuration.

SUMMARY OF THE INVENTION

In one aspect, a supply voltage and multiple control signals can be supplied to an assembly of active components over a simple two lead cable.

In one embodiment of the present invention, a pulse width modulated (PWM) signal is sent to an assembly of active components over a simple coaxial cable. A circuit is implemented that translates the PWM signal into a supply voltage as well as a set of control signals to control the active components.

In another embodiment of the invention, a multi-mode signal conditioner combines a plurality of RF and PWM signals and transmits them over a single transmission line. A tuning decoder separates RF signals from low frequency control signals and distributes the signals to one or multiple active components.

In yet another embodiment of the present invention, a multi-mode signal conditioner combines a plurality of RF and PWM signals and transmits them over multiple transmission lines. Multiple tuning decoders are used to separate the RF signals from low frequency control signals and distribute said signals to an array multiple active components.

BRIEF DESCRIPTION OF THE DRAWINGS

These and other attributes of the invention are further described in the following detailed description of the invention, particularly when reviewed in conjunction with the drawings, wherein.

DETAILED DESCRIPTION

Figure 1:
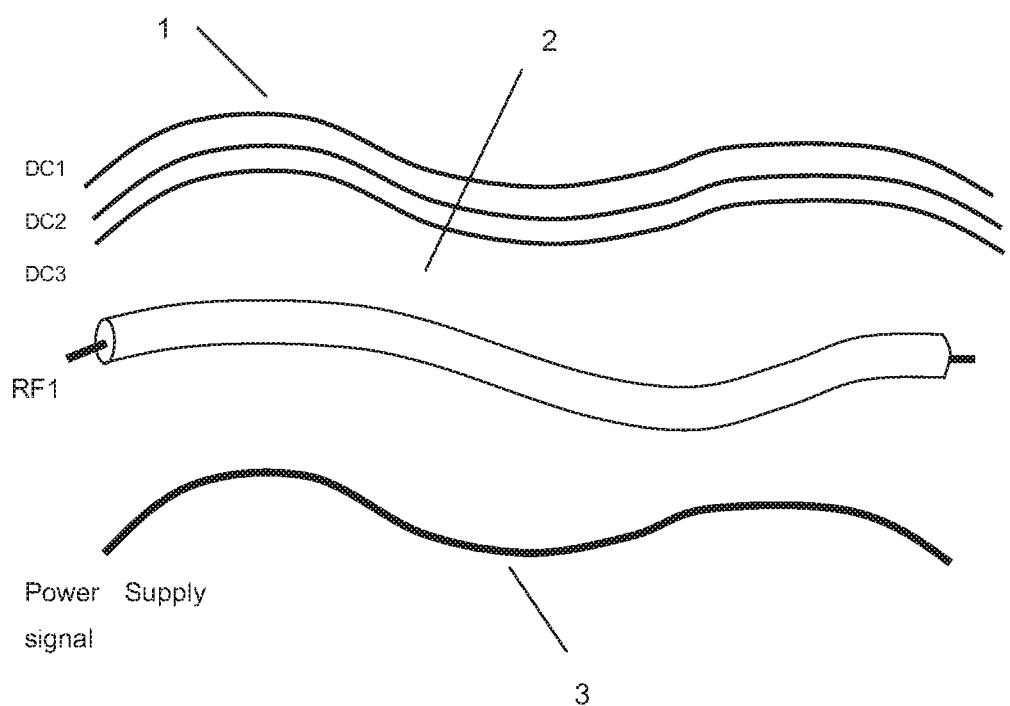
FIG. 1 illustrates an example of wiring typically found in current communication equipment and electronic systems.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Certain embodiments of the invention provide methods for actively configuring a tunable antenna, such as a multi-mode active antenna system having one or more antenna radiating structures, parasitic elements, or the like which are actively configured using one or more active components. The active components are controlled in order to tune the multi-mode antenna system. Multi-mode tunable antennas can be adapted to take into account beam switching, beam steering, space or polarization diversity, dynamic impedance matching, dynamic frequency switching, mode switching, etc., in order to reduce the size of devices and improve performance. Commonly owned U.S. Pat. No. 7,911,402, titled "ANTENNA AND METHOD FOR STEERING ANTENNA BEAM DIRECTION" describes a multi-mode active antenna system that is compatible with embodiments herein; the contents of which are hereby incorporated by reference.

In one embodiment, a tuning decoder circuit is provided for use with an active tunable antenna system, the tuning decoder circuit includes an input port for receiving a Pulse Width Modulation (PWM) signal, a first circuit path and a second circuit path. The first circuit path further includes a rectifier and one or more low-pass filters for generating DC supply voltage for use in configuring one or more active components within a tunable antenna. The low pass filters can be replaced with band pass filters in a similar embodiment. The second circuit path further includes a low pass circuit for generating a control signal that is controlled by the PWM signal. The tuning decoder further includes a control logic circuit to apply the DC supply voltage from the first circuit path and the control signal from the second circuit path to one or more active components for controlling active components of a tunable antenna.

In another embodiment, the band pass or low pass filters are placed between the different stages controlling different devices to reduce interference between devices reducing overall noise and reducing the signal processing required by the transceiver.

In another embodiment, an initial stage is used to expand the PWM signal to full amplitude prior to decoding. A detection circuit can be further implemented to determine when a pulse width modulation is being sent, and a hold circuit can be included for maintaining the state once the pulse width modulation ends. The detection and decoding circuits of the tuning decoder can decode a series of digital bits representing the control signal.

In another embodiment of the invention, a circuit control system is provided for controlling multiple modes of a tunable antenna. A multi-mode active circuit control system is provided, the system including a multi-mode signal conditioner, a control cable assembly, and a tuning decoder. The multi-mode signal conditioner provides a method for combining RF from low frequency signals to include DC. The cable assembly provides a method for sending the supply and control signals for active components to a location not coincident with the transceiver system. The tuning decoder separates and converts the PWM and supply signals into multiple active components.

In another embodiment, the multi-mode signal conditioner supplies composite multiple signals to multiple transmission lines connected to multiple tuning decoders. The tuning decoders separate and convert the PWM and supply signals into multiple control and supply signals for a plurality of active components.

In another embodiment, an active circuit control system includes a PWM signal, a frequency selective circuit, and a tuning decoder. The frequency selective circuit provides a method for separating RF from low frequency signals to include DC. The tuning decoder converts the PWM signal into multiple control signals for one or multiple active components.

In yet another embodiment, the supply and control signals are sent using a lower amplitude input PWM with DC offset to reduce the power variations seen by the transceiver and overall system noise. The control signals can be sent only when a state needs to change and constant DC can be sent otherwise. The PWM can be replaced with a series of digital bits, the series of bits containing digital information on how to control the active components. Alternatively, the supply and control signals can be sent using a lower amplitude input signal with DC offset to reduce the power variations seen by the transceiver and overall system noise.

Now turning to the figures, the invention is further described in detail within particular embodiments. Although certain detailed embodiments are illustrated, it should be recognized by one having skill in the art that these representative embodiments are for illustrative purposes only, and that certain obvious variations will be readily apparent to one having skill in the art which may vary from these illustrated embodiments.

FIG. 1 illustrates wiring that is typically found in communication equipment and electronic systems. Wires 1 for DC control, coaxial cable 2 for RF signal transmission, and wire 3 for power supply are commonly used to power and control components.

Figure 2:
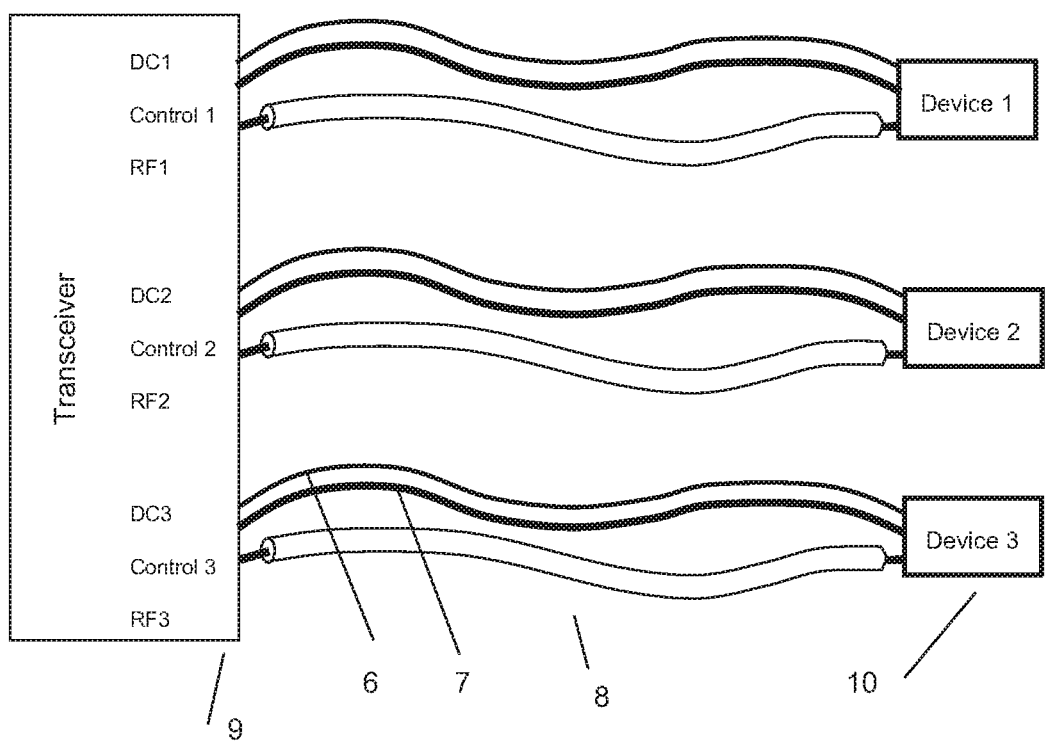
FIG. 2 illustrates an example of wiring required to provide control, supply, and RF signals from a transceiver to multiple active components.

FIG. 2 illustrates wiring used to connect a transceiver to a plurality of active components. Wires 6 for DC control, coaxial cable 8 for RF signal transmission, and wire 7 for power supply are used to connect transceiver 5 to device 10. As the number of active components increases, the number of required wires or transmission lines also increases. A space savings can be realized with reduced wires, cables, or other transmission lines in the circuitry.

Figure 3:
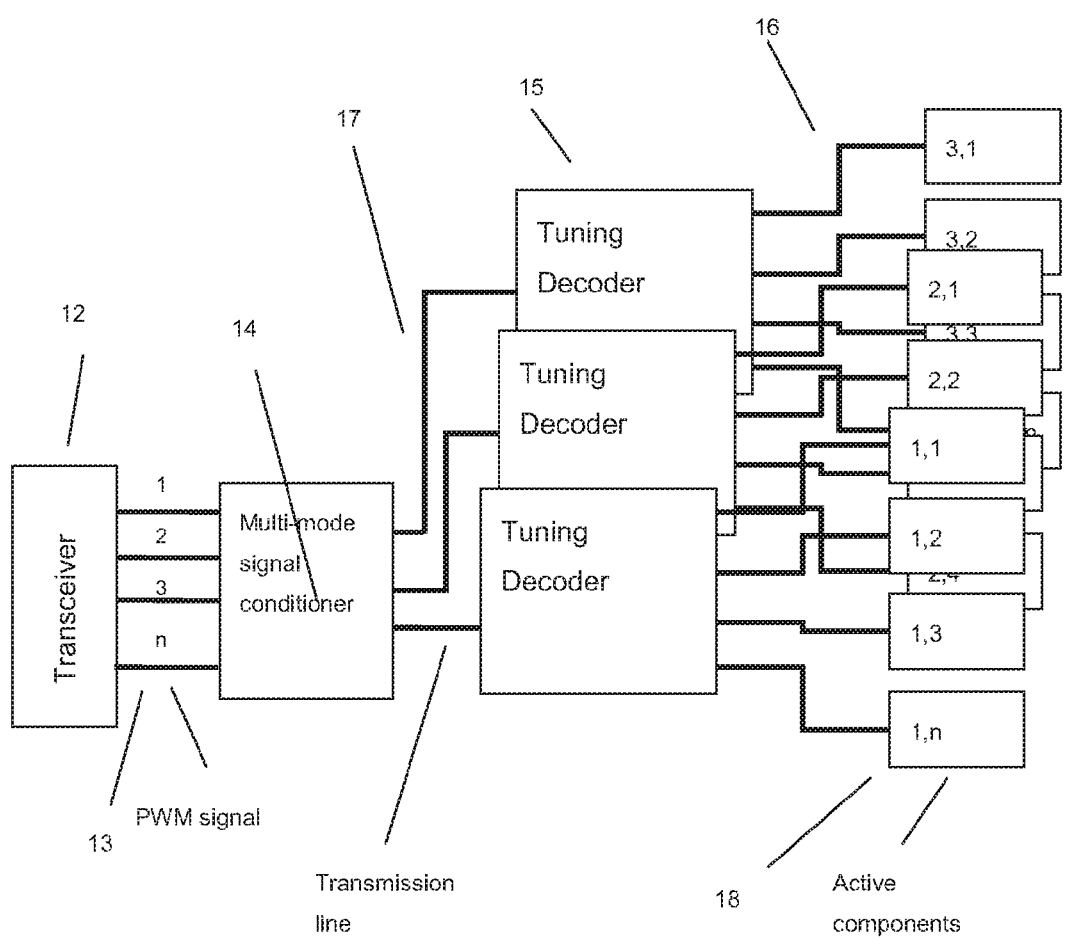
FIG. 3 illustrates a multi-mode active circuit control system comprising a multi-mode signal conditioner, transmission lines, and tuning decoders connected to active components. This control system is capable of driving and controlling a multitude of active devices while providing reduced transmission line requirements.

FIG. 3 illustrates a multi-mode active circuit control system consisting of a multi-mode signal conditioner 14 connected to a transceiver 12 using multiple cables 13, and also connected to tuning decoders 15 using transmission lines 17, and tuning decoders connected to active components 18. This control system is capable of driving and controlling a multitude of active devices.

Figure 4:
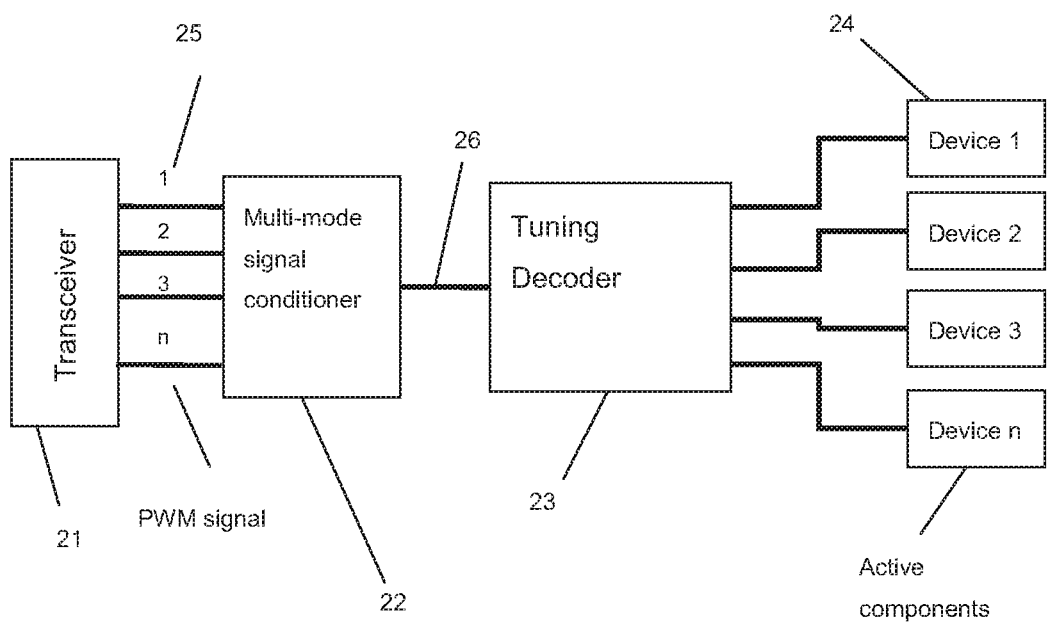
FIG. 4 illustrates a multi-mode active circuit control system comprising a multi-mode signal conditioner, a single transmission line, and a tuning decoder connected to active components.

FIG. 4 illustrates a multi-mode active circuit control system consisting of a multi-mode signal conditioner 22 connected to a transceiver 21 using multiple cables 25. A single transmission line 26 connects the multi-mode signal conditioner to the tuning decoder 23, which in turn is connected to multiple active components 24 over multiple cables.

Figure 5:
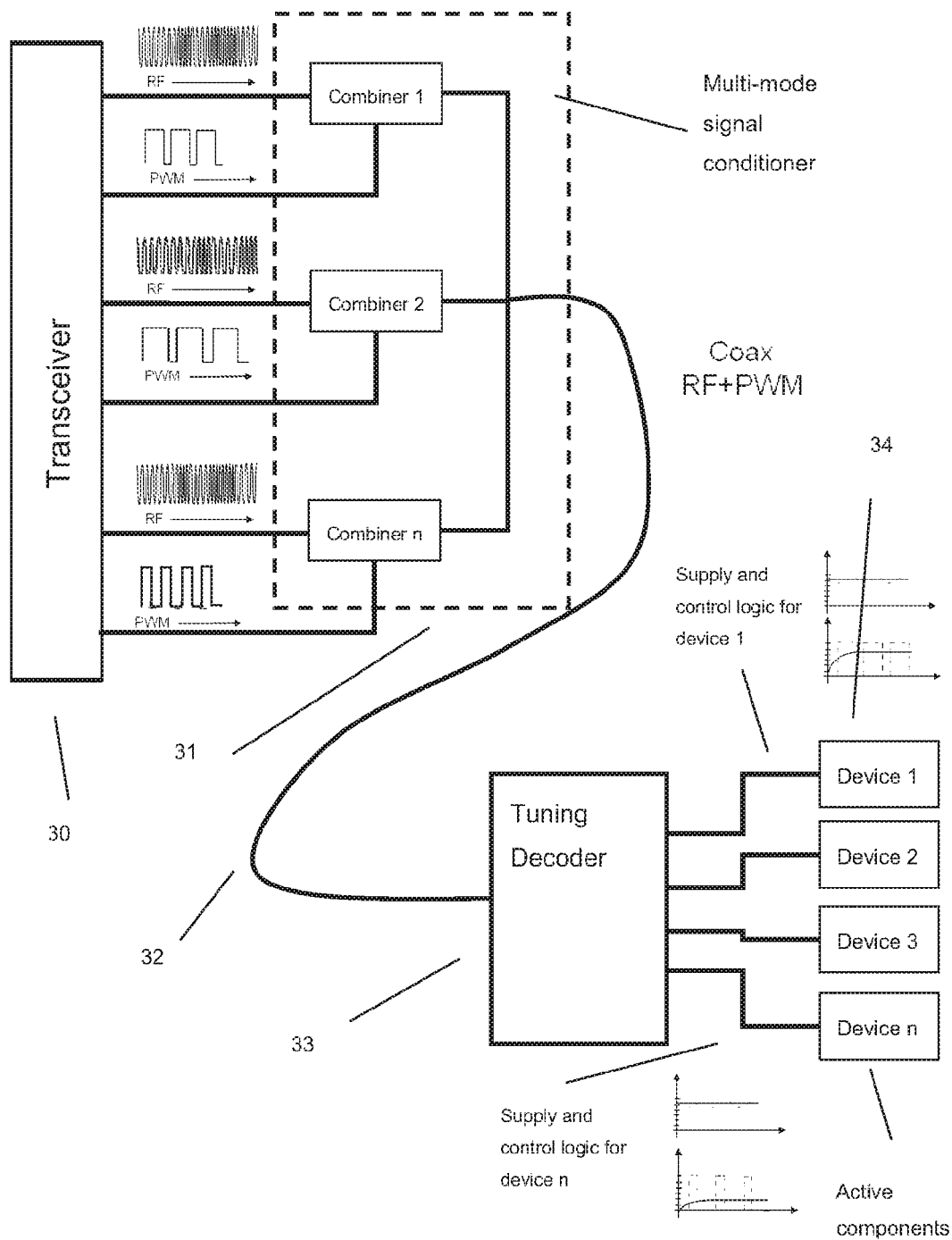
FIG. 5 illustrates a multi-mode active circuit control and activation system, having multiple pairs of RF and PWM signals injected into a signal conditioner, with the resultant waveform conducted over a transmission line. A tuning decoder generates supply and control signals from the waveform, and supplies these signals to the various active components.

FIG. 5 illustrates a multi-mode active circuit control and activation system, having a transceiver 30 connected to a multi-mode signal conditioner 31 using multiple cables to inject radiofrequency (RF) and pulse width modulated (PWM) signals into the signal conditioner. The resultant waveform, herein referred to as a "combined signal", is generated from the signal conditioner and is communicated over the transmission line 32 connected to a tuning decoder 33. The tuning decoder generates supply and control signals from the combined signal, and supplies these signals to the various active components 34.

Figure 6:
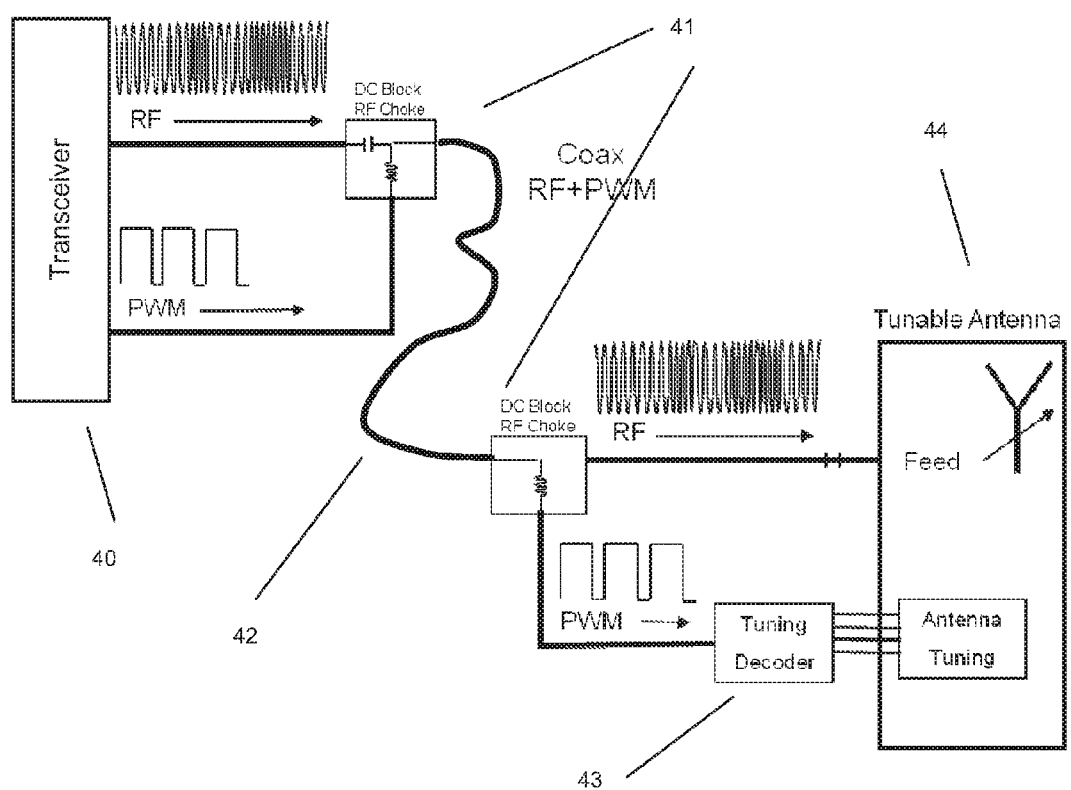
FIG. 6 illustrates a typical application of a technique combining an RF and PWM signal and injecting the combined signal into a transmission line. At the other end of the transmission line, the RF and PWM signals are separated and supplied to an active antenna assembly, with the RF signal supplied to the feed port of the antenna and the PWM signal converted to a supply signal and control signal by the tuning decoder.

FIG. 6 illustrates a typical application of this technique where RF and PWM signals are generated in a transceiver 40 and combined using an RF choke circuit 41 and injected into a transmission line 42. At the other end of the transmission line, the RF and PWM signals are separated using a second RF choke circuit and supplied to an active antenna assembly 44, with the RF signal supplied to the feed port of the antenna and the PWM signal converted to supply and control signals by the tuning decoder 43 for communicating with the active components of the tunable antenna, resulting in multiple tunable modes of the antenna.

Figure 7:
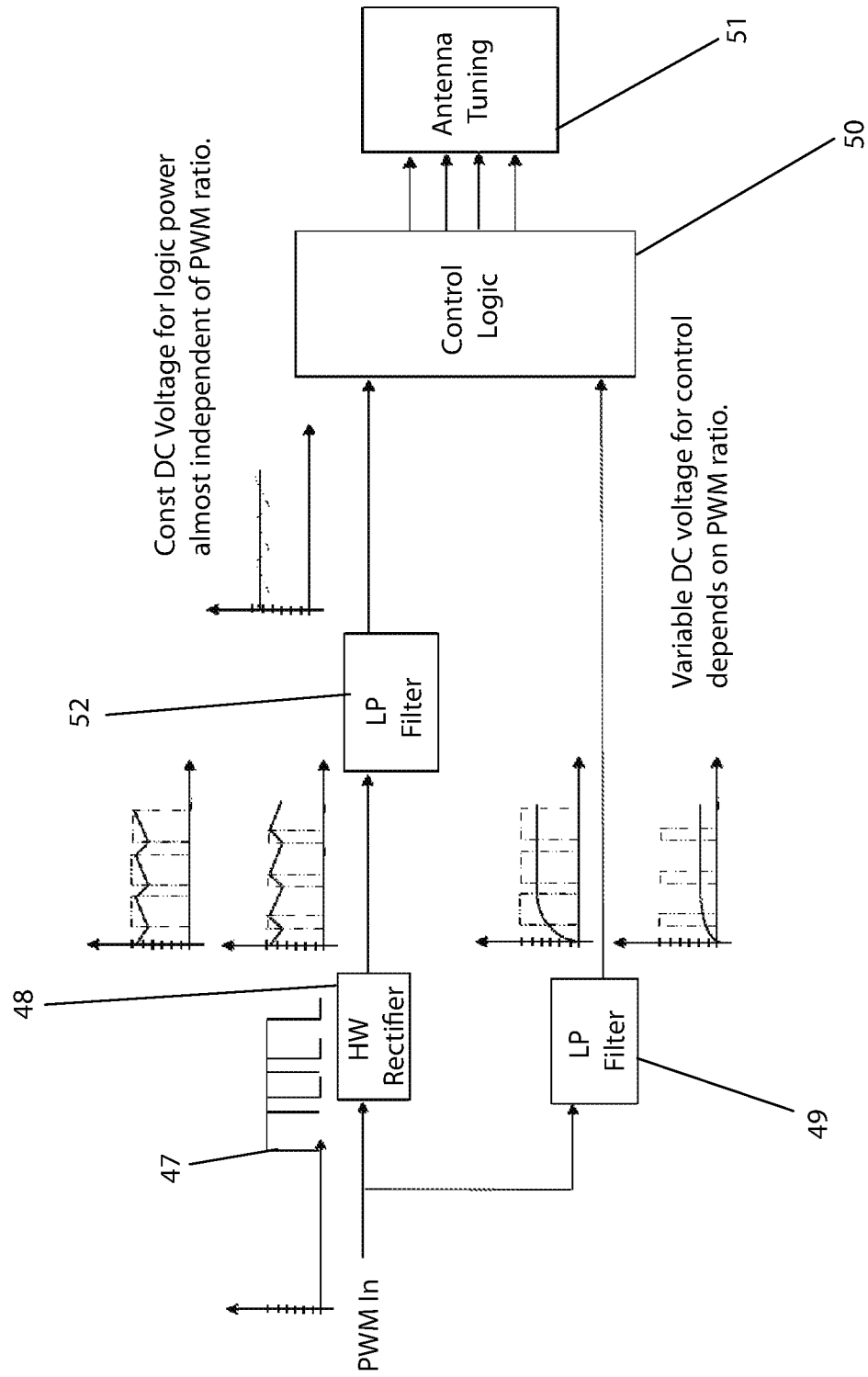
FIG. 7 further illustrates a tuning decoder, wherein a PWM signal is split into two components, one component of the PWM signal is rectified to provide a constant value supply signal and the other component filtered to provide a control signal. Both signals are connected to a control logic unit which provides supply and control signals to active components.

FIG. 7 illustrates an example tuning decoder that may be used in the above embodiments. A PWM signal 47 is split into two components, with one component rectified by a rectifier 48 and passed through a filter 52 to provide a constant value supply signal and the other component filtered by filter 49 to provide a control signal. Both signals are connected to a control logic unit 50 which provides supply and control signals to active components 51.

Figure 8:
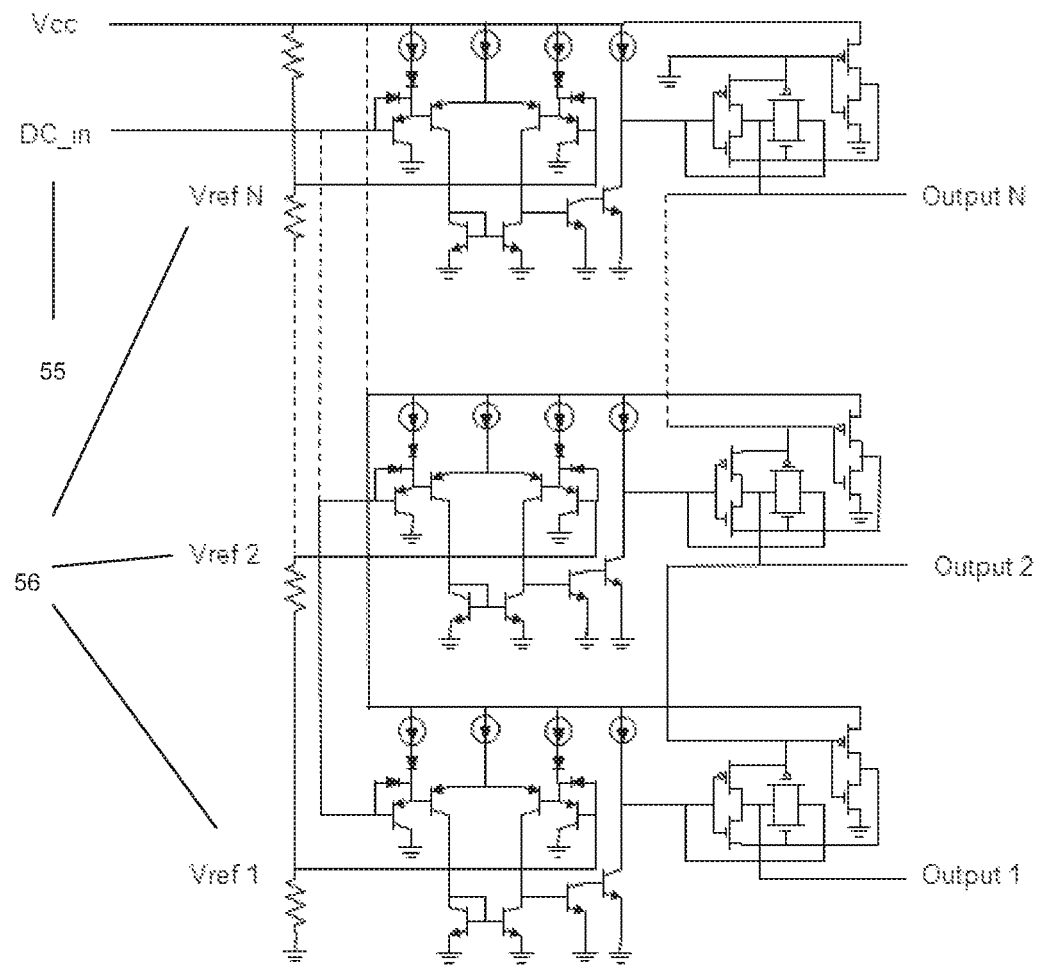
FIG. 8 illustrates an example of a control logic circuit. The control logic circuit sets one output high with all others low depending on the level of $DC_{in}$. Resistors form reference voltages. Analog circuits output $V_{cc}$ if $DC_{in}$ is greater than the reference voltage. Digital Logic selects the highest reference voltage reached.

FIG. 8 illustrates an example of a control logic circuit that may be used in the above embodiments. The control logic circuit sets one output high with all others low depending on the level of $DC_{in}$ 55. Resistors 56 form reference voltages. Analog circuits output $V_{cc}$ if $DC_{in}$ is greater than the reference voltage. Digital Logic selects the highest reference voltage reached.

Figure 9:
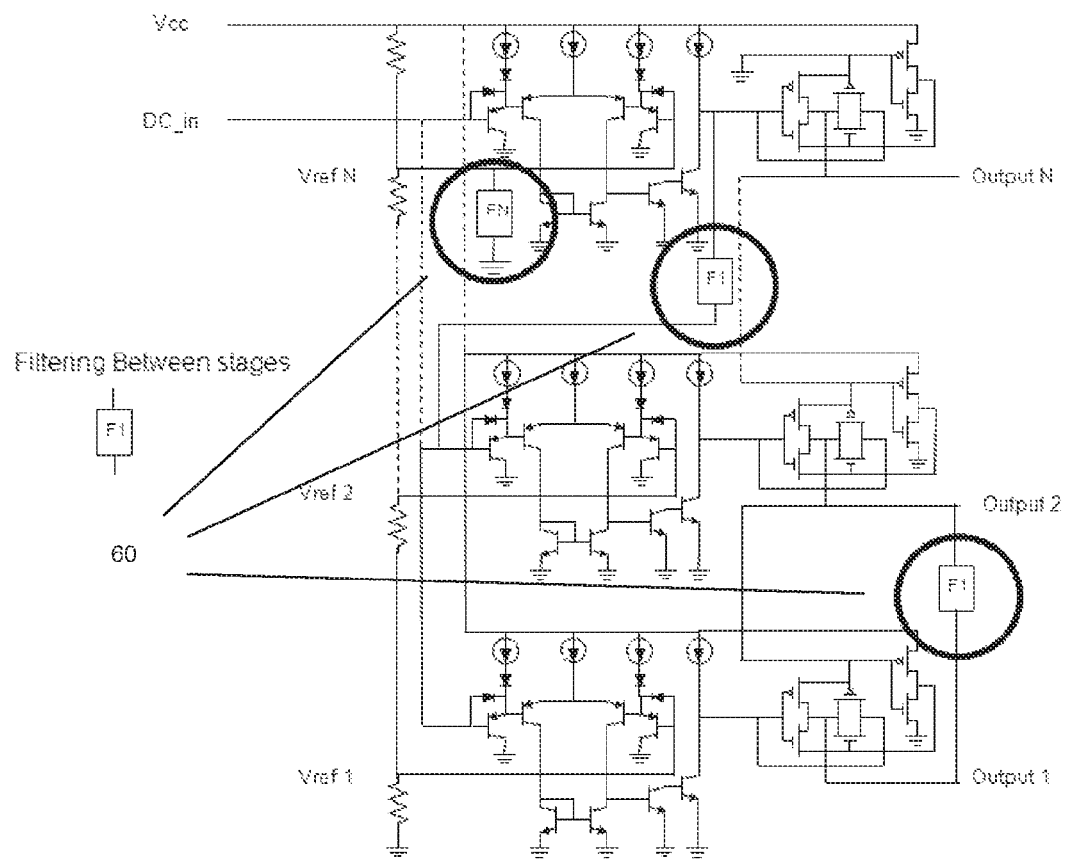
FIG. 9 illustrates an example of a control logic circuit where filtering is applied to de-couple the sections of the circuit and to reduce ripple in the output signal.

FIG. 9 illustrates an example of a control logic circuit where filters 60 are applied to de-couple the sections of the circuit and to reduce ripple in the output signal.

Figure 10:
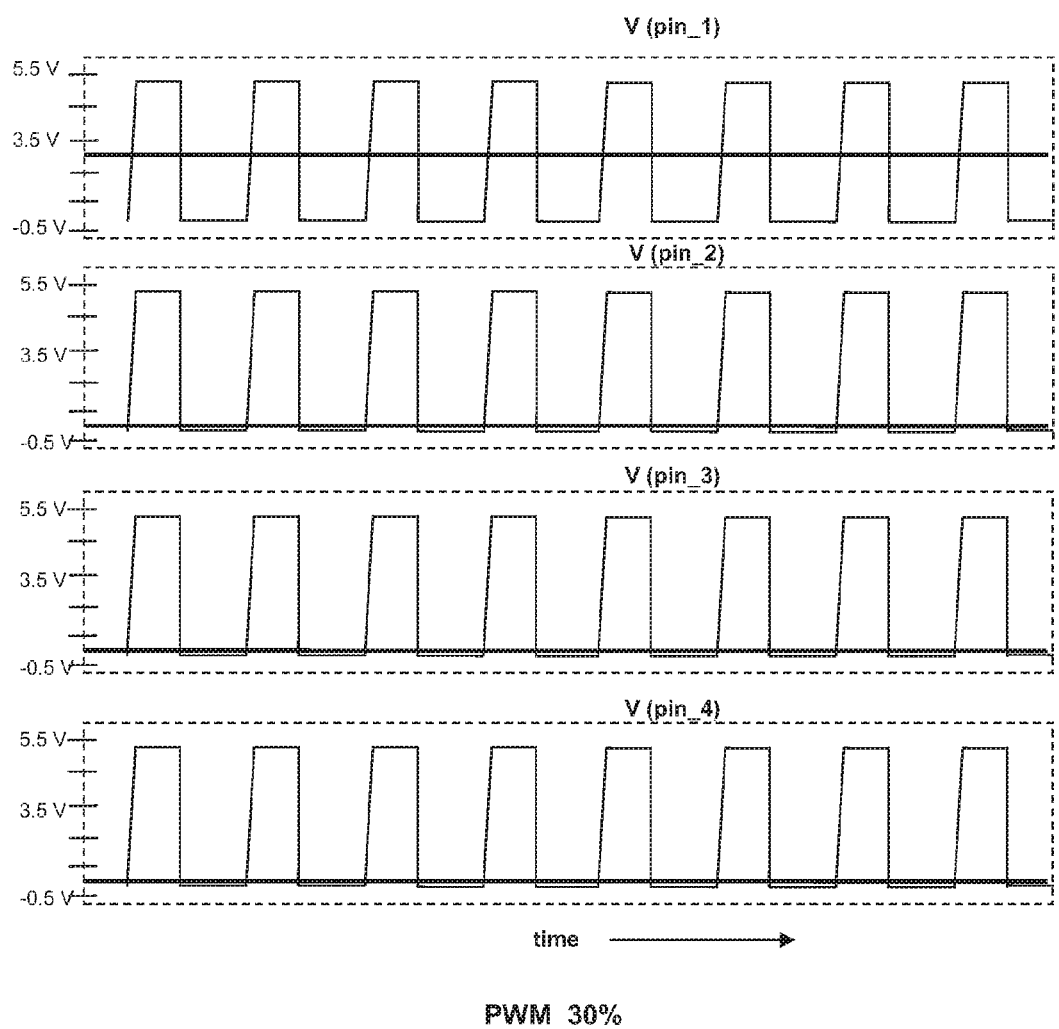
FIG. 10 illustrates an example of the control signal supplied by a tuning decoder when a 30% modulation PWM signal is supplied to the decoder. A 3V control signal is supplied to pin 1 of the tuning decoder for use with an active component.

FIG. 10 illustrates an example of the control signal supplied by a tuning decoder when a 30% modulation PWM signal is supplied to the decoder. A 3V control signal is supplied to pin 1 of the tuning decoder for use with an active component.

Figure 11:
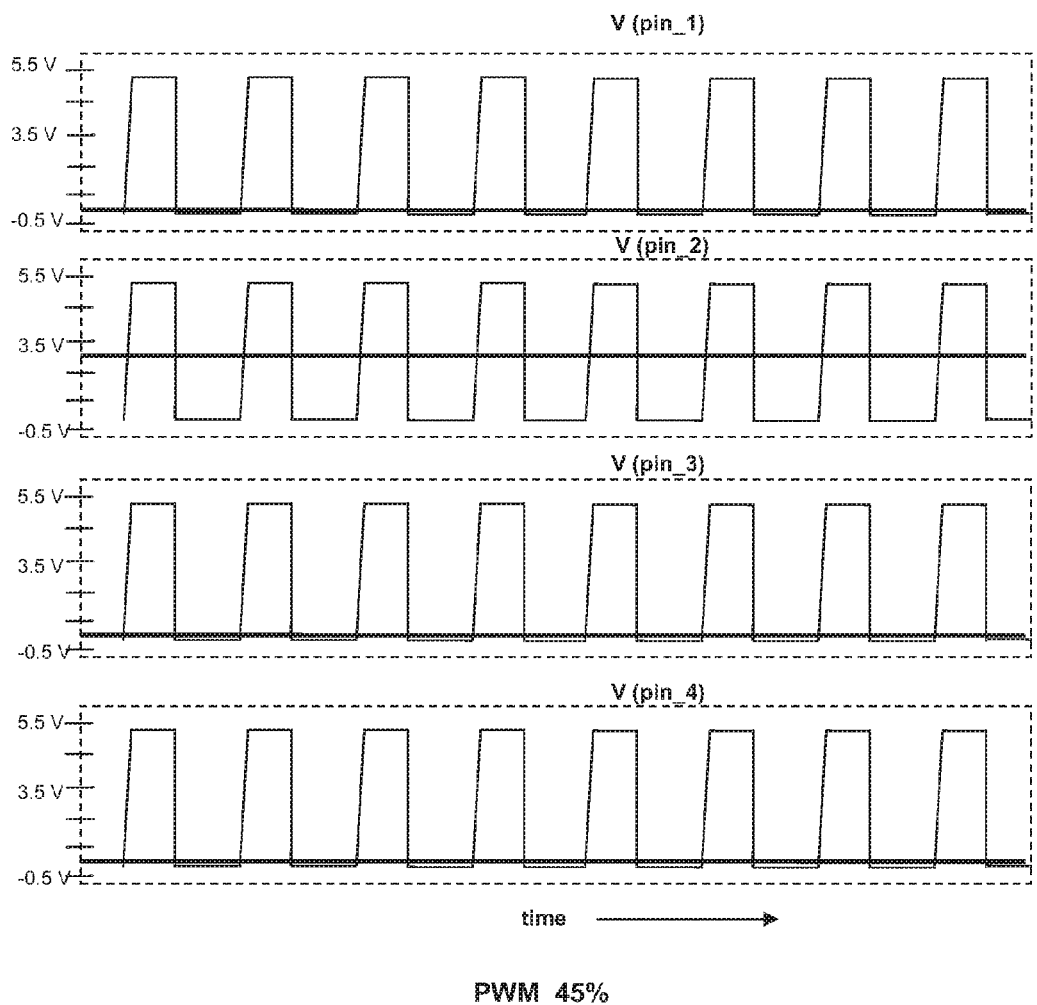
FIG. 11 illustrates an example of the control signal supplied by a tuning decoder when a 45% modulation PWM signal is supplied to the decoder. A 3V control signal is supplied to pin 2 of the tuning decoder for use with an active component.

FIG. 11 illustrates an example of the control signal supplied by a tuning decoder when a 45% modulation PWM signal is supplied to the decoder. A 3V control signal is supplied to pin 2 of the tuning decoder for use with an active component.

Figure 12:
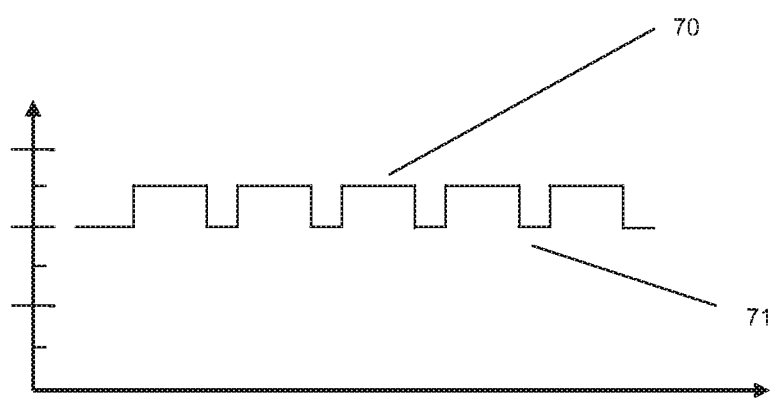
FIG. 12 illustrates an example of a Pulsed waveform that is not modulated to zero, but instead modulates to an intermediate value. This relieves the power drain when compared to a PWM signal that modulates to 0 V DC.

FIG. 12 illustrates an example of a Pulsed waveform 70 that is not modulated to zero, but instead modulates to an intermediate value 71. This relieves the power drain when compared to a PWM signal that modulates to 0 V DC.

Figure 13A:
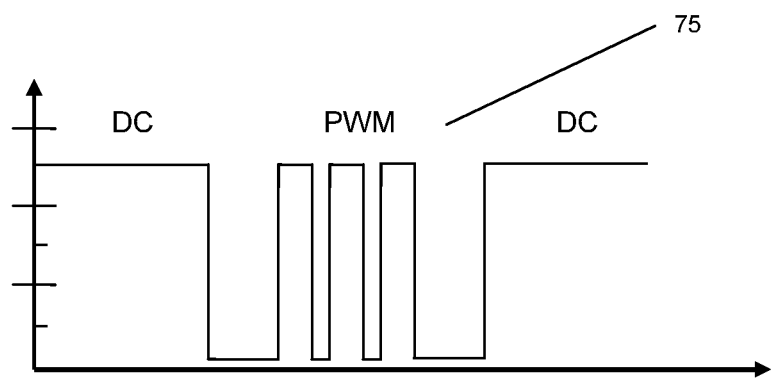
FIG. 13(A-B) illustrate an example of a PWM signal that is only modulated when a command is sent. The tuning decoder needs to detect incoming commands when a low has been held for a certain time. The PWM signal can be generated such that it is not modulated to zero, but instead modulates to an intermediate value.
Figure 13B:
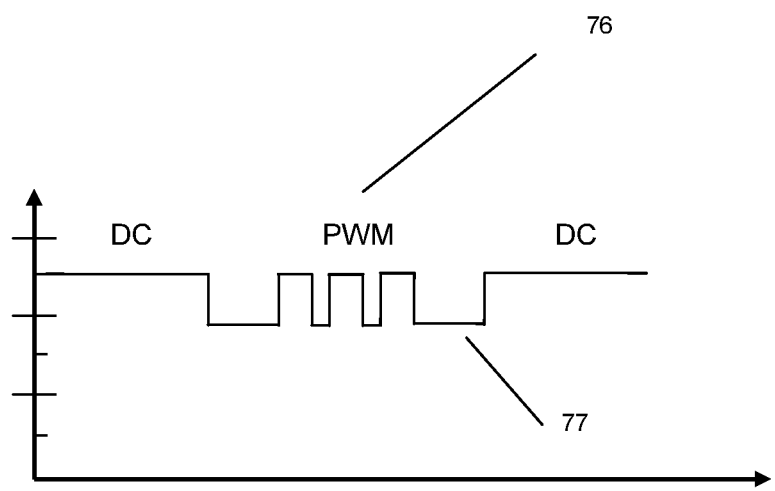

FIG. 13 illustrates an example of a PWM signal 75 that is only modulated when a command is sent. The tuning decoder needs to detect incoming commands when a low has been held for a certain time. The PWM signal 76 can be generated such that it is not modulated to zero, but instead modulates to an intermediate value 77.

Figure 14A:
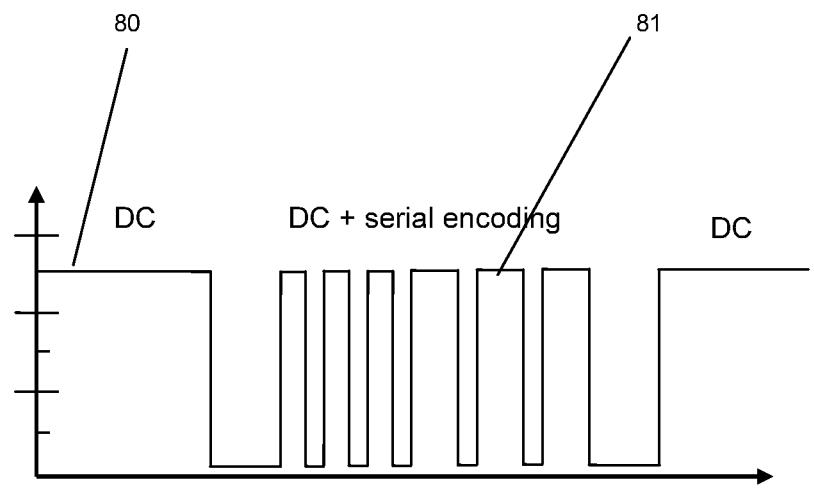
FIG. 14(A-B) illustrate an example of a PWM signal that is not modulated to zero and only modulated when a command is sent. Also illustrated is a PWM waveform where DC is only modulated when a command is sent. The code can be a series of bits such as in SPI. The tuning decoder needs to detect incoming commands when a low has been held for a certain time and be able to decode smaller amplitude variations
Figure 14B:
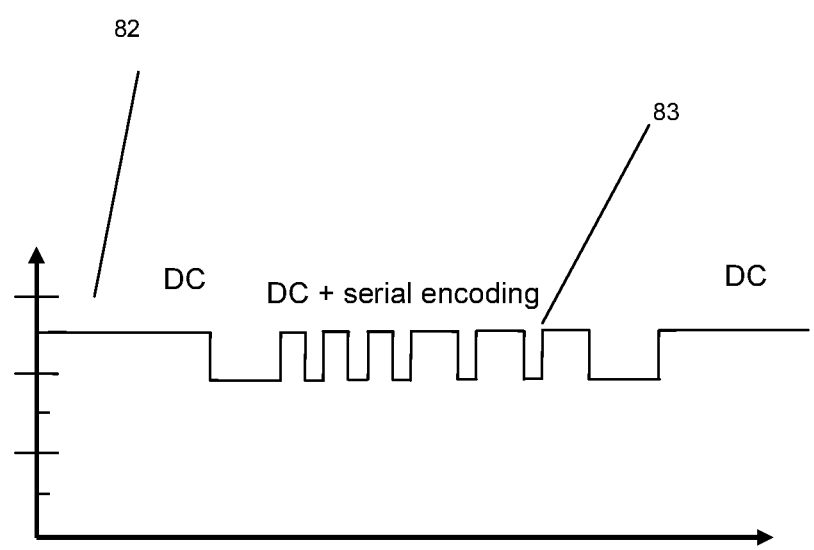

FIG. 14 illustrates an example of a PWM signal 80 that is not modulated to zero and only modulated 81 when a command is sent. Also illustrated is a PWM waveform 82 where DC is only modulated 83 when a command is sent. The code can be a series of bits such as in SPI. The tuning decoder needs to detect incoming commands when a low has been held for a certain time and be able to decode smaller amplitude variation.

The above examples are set forth for illustrative purposes and are not intended to limit the spirit and scope of the invention. One having skill in the art will recognize that deviations from the aforementioned examples can be created which substantially perform the same tasks and obtain similar results.

What is claimed is:

1. An active circuit control system comprising:
   a tuning decoder circuit, the tuning decoder circuit comprising:
   an input port configured to receive a PWM signal and communicate the PWM signal to each of:
      a first circuit path, the first circuit path comprising a rectifier and one or more filters for generating DC supply voltage for one or more active components associated with a tunable antenna, and
      a second circuit path, the second circuit path comprising a low pass circuit, the second circuit path being configured to generate a control signal that is controlled by the PWM signal;
   each of the first and second circuit paths further coupled to a control logic circuit, the control logic circuit being configured to apply the DC supply voltage from said first circuit path and the control signal from said second circuit path to the one or more active components for controlling a tuning state thereof.

2. The active circuit control system of claim 1, wherein said one or more filters of the first circuit path includes a band pass filter.

3. The active circuit control system of claim 1, wherein said one or more filters of the first circuit path includes a low pass filter.

4. The active circuit control system of claim 1, wherein at least one of said filters of the first circuit path is positioned between device control stages for reducing interference between devices.

5. The active circuit control system of claim 1, wherein the system is adapted to expand the PWM signal to full amplitude in an initial stage prior to decoding.

6. The active circuit control system of claim 5, wherein said tuning decoder includes a detection circuit adapted to detect a PWM signal and a hold circuit adapted to maintain a state upon the end of the PWM signal.

7. The active circuit control system circuit of claim 6, wherein said detection and decoding circuits are adapted to decode a series of digital bits representing said control signal.

8. An active circuit control system, comprising:
- a PWM input configured to receive a PWM signal, the PWM input bifurcated to form a first circuit path and a second circuit path,
- the first circuit path comprising a rectifier and one or more filters,
- the second circuit path comprising a low pass circuit,
- each of the first and second circuit paths being coupled to a control logic circuit; wherein:
- the first circuit path is configured to provide a constant DC voltage for communicating with the control logic circuit, and
- the second circuit path is configured to provide a variable DC voltage based on the PWM signal for communicating with the control logic circuit.

* * * * *